Aug. 20, 1957  W. CLAYTON  2,803,132
DYNAMOMETER WITH AIR-OPERATED VEHICLE LIFT
Filed April 3, 1953
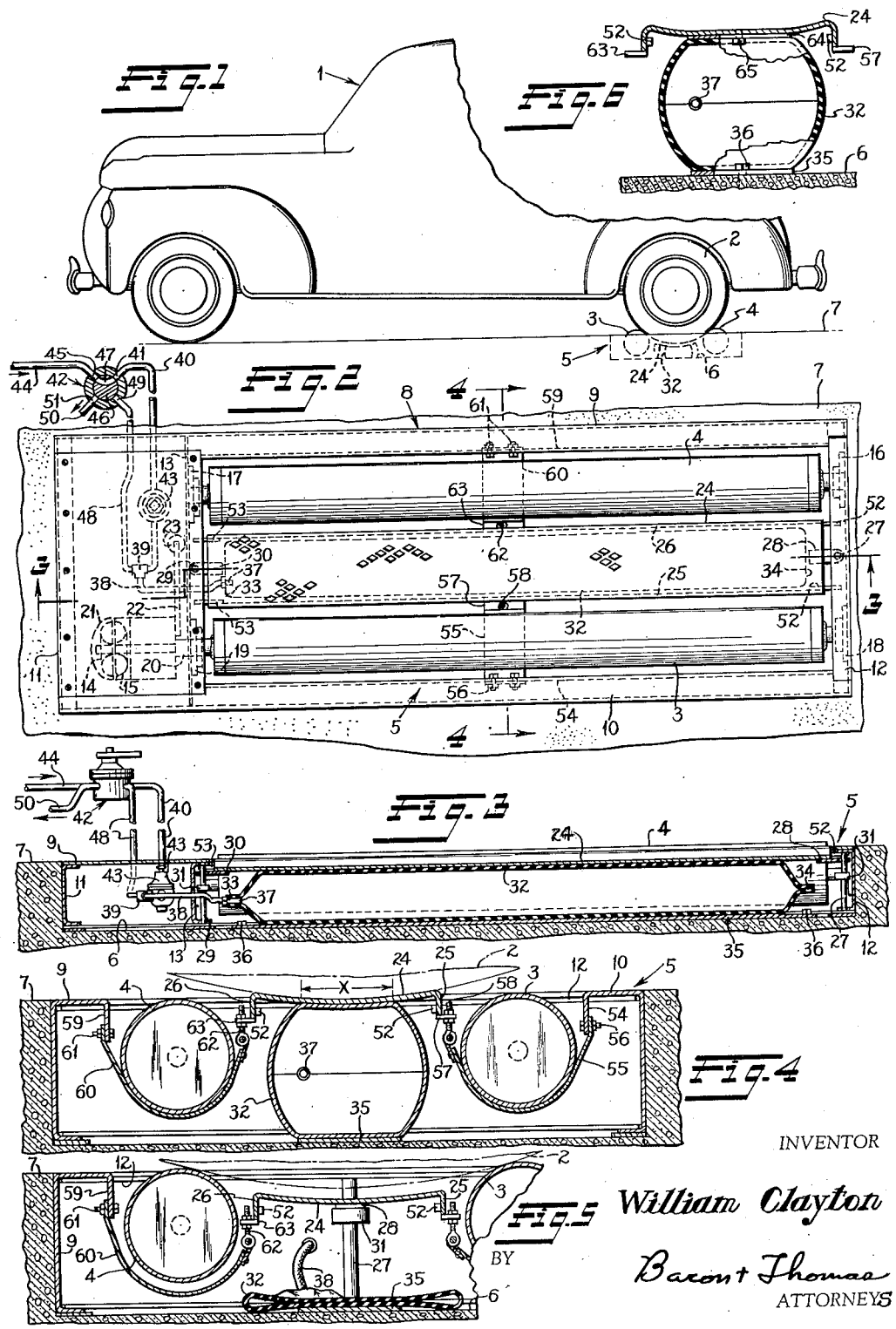
INVENTOR
William Clayton
BY
Baron + Thomas
ATTORNEYS

United States Patent Office 2,803,132
Patented Aug. 20, 1957

2,803,132

DYNAMOMETER WITH AIR-OPERATED VEHICLE LIFT

William Clayton, Pasadena, Calif., assignor to Clayton Manufacturing Company, El Monte, Calif., a corporation of California Application April 3, 1953, Serial No. 346,757

6 Claims. (Cl. 73—117)

The present invention relates to dynamometers, and more particularly to dynamometer apparatus useful in garages or service stations for enabling a quick diagnosis to be made of malfunctioning parts of a vehicle engine, transmission, etc., prior to acceptance of the vehicle for servicing.

More particularly, the invention relates to dynamometer apparatus adapted to be installed, preferably in the service aisle or adjacent the service entrance of a garage, etc., for enabling the service manager or mechanic to place a load on the driven wheels of a vehicle to determine minor or major defects in the functioning of the vehicle, such as, the possible need for new spark plugs, adjustment of valves, replacement of wrist pins and/or pistons, correction of low oil pressure, carburetor adjustment, transmission adjustment (especially for vehicles having automatic gear shift transmissions), clutch adjustment or replacement to correct slippage, and/or replacement of the clutch disc or clutch bearing, etc., without requiring actual road testing of the vehicle to ascertain these defects.

More specifically, the invention relates to chassis dynamometer apparatus including a drive roll, an idle roll, and a hydraulic power absorption unit connected with the drive roll for absorbing the power delivered by the driven wheels of a vehicle, together with a lift plate and an inflatable tube for quickly raising the lift plate into engagement with the vehicle wheels to permit a vehicle to be readily driven off the rolls after a quick diagnosis of the vehicle's ailments has been made.

As is well known, during the testing of a vehicle, the driven wheels of the vehicle are cradled between the drive and idle rolls, and one of the features of the present invention resides in the provision of means for automatically applying a brake to the drive and idle rolls as the lift plate is operated to raise the vehicle off the rolls, so that the vehicle can be either driven forwardly or backed off the rolls, after a test has been made.

Another feature of the invention is that the lift plate, when raised, is maintained supported by its inflatable raising means so that it will not drop or be substantially depressed when a vehicle is driven thereacross without stopping the same to cradle the rear wheels between the rolls.

Accordingly, the principal object of the invention is to provide dynamometer apparatus especially adapted for service work that will enable a service manager or mechanic to make a quick check for malfunctioning parts of a vehicle in order to demonstrate and to better advise the vehicle operator of the necessary adjustments or repairs that must be made to the vehicle in order to place it in proper operating condition.

Another object is to provide chassis dynamometer apparatus that will enable a vehicle to be driven off the rolls without requiring the engagement of pawls or other manually operated apparatus to lock the rolls against turning while the vehicle is being removed from the rolls.

A further object is to provide chassis dynamometer apparatus including lift means for raising the cradled wheels of a vehicle off the dynamometer rolls and simultaneously locking the rolls against rotation so that the vehicle can be readily driven over either roll to remove the vehicle from the dynamometer.

A sitll further object is to provide dynamometer apparatus having pneumatically operated lift means controlled so that the lift means, when elevated, will be able to withstand the driving of a vehicle thereacross without any substantial depression thereof.

Still another object is to provide control means for a pneumatic lift that will maintain a substantially constant air pressure in the lift actuating means to prevent inadvertent collapsing thereof.

A still further object is to provide vehicle lift means that can be economically manufactured and which will eliminate prior expensive lift apparatus requiring a large cylinder and a heavy double cantilever lifting beam.

Other objects and features of the invention will be apparent from the following description taken in conjunction with the accompanying drawings, in which:

Fig. 1 is a somewhat diagrammatic view illustrating a vehicle supported upon a chassis dynamometer embodying the principles of the present invention;

Fig. 2 is a plan view of the dynamometer apparatus shown in Fig. 1;

Fig. 3 is a longitudinal sectional view taken on the line 3—3 of Fig. 2 and showing the lift plate raised;

Fig. 4 is a transverse sectional view taken on the line 4—4 of Fig. 2;

Fig. 5 is a transverse sectional view similar to Fig. 4, but illustrating the lift plate in its lowered position and showing the inflatable means in a completely collapsed condition; and Fig. 6 is a fragmentary sectional view illustrating a modified form of the invention.

Referring now to Fig. 1, the numeral 1 generally identifies a vehicle undergoing test and having its driven wheels 2 cradled between a drive roll 3 and an idle or driven roll 4 of a chassis dynamometer generally identified by the numeral 5. The dynamometer apparatus 5 is preferably of the pit type, that is to say, of the type that is mounted in a pit 6 in a floor 7, so that the top of the apparatus is substantially flush with the surface of the floor. However, it is to be understood that the present invention is not limited to pit-type chassis dynamometers but may be readily incorporated in on-the-floor-type or portable chassis dynamometer apparatus. The pit-type is preferred, of course, since it eliminates obstructions above the floor level and does not require the use of ramps to mount the vehicle on the dynamometer rolls.

Referring now more particularly to Figs. 2 and 3, the dynamometer apparatus 5 includes a frame generally identified by the numeral 8 and comprising longitudinally extending channel members 9 and 10 disposed with their flanges in confronting relation and interconnected at the opposite ends thereof by transversely disposed channel members 11 and 12 and an intermediate channel member 13, the channel members 12 and 13 confronting each other. The various channel members comprising the frame 8 are preferably welded together, although the same may be riveted or bolted, if desired. The drive roll 3 and the idle roll 4 are disposed in parallel relation adjacent the frame members 10 and 9, respectively. The idle roll 4 is rotatably supported in conventional anti-friction bearings 16 and 17 mounted upon the channel members 12 and 13, respectively. The drive roll 3 is similarly supported in bearings 18 and 19.

The drive roll 3 has an extended shaft portion 20 upon which a known type of hydraulic power absorption unit 21 is mounted. As is well understood in the art, such power absorption units include, as elements, a vaned rotor 14 connected with the drive roll 3 and a vaned stator 15 cooperatively arranged to provide a working circuit for brake liquid which resists rotation of the rotor relative to the stator, and since the rotor is connected with the drive roll 3, the unit resists rotation of said drive roll and in this way absorbs the power delivered at the wheels 2 of the vehicle 1. The hydraulic brake unit 21, of course, includes the usual means (not shown) for admitting and withdrawing brake liquid from the stator 15 to vary the volume of brake liquid in the unit to correspondingly vary the load absorption capacity thereof, but since the particular brake unit per se is not a vitalizing part of the present invention, the same need not be described in detail herein, other than to further add that the stator has a torque arm 22 connected therewith that is cooperable with an element 23 forming part of torque-indicating apparatus of a known type, for indicating the power being absorbed by the brake unit.

A metallic lift plate 24 is disposed between the drive roll 3 and the idle roll 4 and substantially fills the space between these rolls; that is to say, it has a width a little less than the space between the rolls 3 and 4, and a length almost equal to the space between the transverse channel members 12 and 13. The lift plate 24 preferably has a concave upper surface, as shown, adapted to engage the tread of the vehicle wheels 2. The plate 24 is stiffened by downwardly extending flanges 25 and 26 disposed along the longitudinal edges thereof. A guide pin 27 is fixed between the horizontal flanges of the transverse channel member 12 and is engaged by a guide plate 28 welded to the underside of the lift plate 24 and having the guide pin 27 extending therethrough. A similar guide pin 29 is fixed between the flanges of the intermediate transverse member 13, and a similar guide plate 30 is engaged with the guide pin 29 and welded to the underside of the lift plate 24. It will be apparent that the guide pins 27 and 29 in conjunction with the guide plates 28 and 30 will function to maintain the lift plate 24 properly positioned between the drive roll 3 and the idle roll 4 during any vertical movement that is imparted to the lift plate 24. The guide pins 27 and 29 may be provided with collars or integral enlargements 31 to limit the downward movement of the plate 24 at a level below that of the tread of any wheels 2 that may be engaged with the rolls 3 and 4, as will be apparent from Fig. 5.

The lift plate 24 is adapted to be elevated or raised by an inflatable element 32 in the form of an elongated cylindrical tube having its opposite ends 33 and 34 cemented together or otherwise closed to prevent the escape of air from the interior of the tube. The tube 32 is preferably made of flexible, non-stretchable material such as fabric reinforced rubber. The tube 32 has a mounting plate 35 (Figs. 3 to 5) optionally vulcanized or cemented to the lower side thereof, for retaining the same in position centrally between the rolls 3 and 4. The plate 35 is in turn secured to the base of the pit 6 by cap screws 36, as best shown in Fig. 3. The upper side of the tube 32 is cemented to the underside of the lift plate 24 in the area designated X in Fig. 4, although such cementing is not essential and, in fact, Fig. 5 illustrates a tube 32 in a fully collapsed condition and devoid of any cement connection with the lift plate 24. Another form of mounting is shown in Fig. 6 and will be described later. The tube end 33 has an inflating fitting 37 mounted therein and one end of a flexible conduit 38 is connected to said fitting. The other end of the conduit 38 is connected to the stem of a pipe-T 39. One side of the pipe-T 39 is connected by a conduit 40 with a pressure port 41 of a conventional four-way control valve 42, diagrammatically shown in Fig. 2. An adjustable, conventional, automatic pressure regulating valve 43 is connected in the conduit 40 and is adapted to close when its outlet is subjected to a given set pressure, whereby to maintain a desired pressure in the tube 32, so long as the valve 42 is in open position. An air supply conduit 44 is connected with a port 45 of the valve 42 and the valve 42 contains a core 46 having a port 47 adapted to interconnect the ports 41 and 45, as shown in Fig. 2, to supply air under pressure to the conduit 40. The other side of the pipe-T 39 is connected to one end of a conduit 48 which has its opposite end connected with a port 49 in valve 42. An exhaust conduit 50 is connected to a port 51 in the valve 42 and is arranged so that when the valve core 46 is rotated through an angle of 180° from the position shown in Fig. 2, it will interconnect the valve ports 49 and 51 to exhaust air from the tube 32 and allow the lift plate 24 to move downwardly by gravity. The lift plate 24 has stops 52 welded to the flanges 25 and 26 thereof which project beyond the end of said lift plate and are adapted to engage the upper horizontal flange of the channel member 12 to limit upward movement of the lift plate 24 and to prevent rocking movement of said plate when the tube 32 is inflated. Similar stops 53 are welded to the opposite ends of the flanges 25 and 26 and are adapted to correspondingly engage the upper flange of the transverse channel member 13 for a like purpose.

The longitudinal frame member 10 has a downwardly extending flange 54 to which one end of a brake band 55 is secured by bolts 56. A lug 57 is welded to the edge of the flange 25 of the lift plate 24 and has an eye bolt 58 adjustably mounted therein and connected to the opposite end of the brake band 55. The frame member 9 has a similar depending flange 59 to which one end of a brake band 60 is secured by bolts 61 and its opposite end is adjustably connected by an eye bolt 62 mounted in a lug 63 welded to the other flange 26 of the lift plate 24. The brake bands 55 and 60 are preferably located at substantially the middle of the rolls 3 and 4, but their location may be changed, if desired.

It will be apparent from Fig. 4 that as the lift plate 24 is raised, the brake bands 55 and 60 will be applied to the rolls 3 and 4, respectively, to positively prevent rotation thereof. Adjustment of the brake bands 55 and 60 for this purpose can be readily effected by inflating the member 32 to raise the lift plate 24 to its maximum height, and then adjusting the eye bolts 58 and 62 to draw up the bands 55 and 60 tightly enough so that the rolls 3 and 4, respectively, are locked against rotation. It will also be apparent from Fig. 4 that when the lift plate 24 is raised to elevate the vehicle wheels 2, said wheels may be driven in either direction off the plate 24 by driving contact made with either of the rolls 3 or 4.

The tube 32 supports the lift plate 24 substantially throughout the length of said plate and the area of the tube in engagement with the lift plate 24 is quite large, and in one operative form of the invention exceeds 400 sq. in. It will be evident, therefore, that air under relatively low pressure may be introduced into the tube 32 and still be capable of readily elevating a vehicle. The total weight of present day passenger cars ranges from about 3,000 to 5,000 lbs. so that an air pressure of 10 lbs. in the tube 32 would be more than adequate to quickly raise either the front or the rear end of a vehicle off the rolls 3 and 4. Accordingly, the pressure regulating valve 43 may be adjusted to maintain and limit the pressure in the inflatable member 32 to any desired pressure necessary to raise any given vehicle, and in any event a pressure that will prevent the lift plate 24 from dropping substantially when the lift plate 24 is raised and a vehicle is driven across the rolls 3 and 4 without stopping, as will occur in instances where no test is to be made of the vehicle. The use of the pressure regulating valve 43 also provides the advantage of assuring that a desired air pressure will be maintained in the inflatable member 32 whenever the valve 42 is opened, and at the same time prevents excessive pressure from being introduced into said inflatable member.

When the valve 42 is opened, air under pressure is supplied through the conduit 40, valve 43 and conduit 38 to the inflatable member 32, the flow through conduit 48 being blocked at this time by the valve core 46. On the other hand, when the port 47 is positioned to interconnect the ports 49 and 51, air under pressure will no longer be supplied to the conduit 40, but on the contrary, will be exhausted from the inflatable member 32 through the conduits 38 and 48 to ultimately discharge to the atmosphere through the exhaust conduit 50. The valve 42 will, of course, be conveniently located for operation by the mechanic or service manager at the conclusion of a test on the vehicle to enable the vehicle to be removed from the rolls 3 and 4.

Fig. 6 illustrates a modification in which a plate 64, similar to the plate 35 is optionally vulcanized or cemented to the upper side of the tube 32 and secured to the underside of the lift plate 24 by cap screws 65 vertically aligned with the cap screws 36. Since the plates 35 and 64 are preassembled with the tube 32, it is a relatively simple matter to install the tube assembly in the apparatus.

It will be understood that when a vehicle is to be tested, the lift plate 24 is retracted, as shown in Fig. 5, so that the vehicle wheels can come to rest cradled between the rolls 3 and 4. The vehicle is then subjected to any necessary tests by the power absorption unit 21 and, thereafter, the valve 42 is opened to inflate the tube 32 to lift the wheels off the rolls so that the vehicle can be removed therefrom, as previously described. Thus, a relatively simple and effective means is provided for subjecting vehicle parts to tests which ordinarily would require road testing to determine whether they are functioning properly.

It will also be understood that various changes may be made in the details of construction and in the arrangement of the parts comprising the dynamometer apparatus disclosed herein, without departing from the principles of the invention or the scope of the annexed claims.

I claim:

1. In a chassis dynamometer, the combination comprising: a pair of rolls adapted to be engaged by the driven wheels of a vehicle; a lift plate disposed between said rolls; a flexible inflatable member beneath said lift plate and extending lengthwise of said lift plate for elevating said lift plate upon inflation of said inflatable member; control means for said inflatable member comprising a manually operable four-way valve; a supply conduit and a return conduit each having one end thereof connected with said four-way valve; a pipe-T having the sides thereof connected with the opposite end of said supply and return conduits; a conduit connecting the stem of said pipe-T with said inflatable member and serving as a conduit for supplying and exhausting operating fluid from said inflatable member; and an automatic pressure regulating valve connected in said supply conduit between said pressure regulating valve and said pipe-T for maintaining a substantially constant pressure in said inflatable member when said pressure regulating valve is open.

2. Chassis dynamometer apparatus, comprising: a frame including longitudinal frame members interconnected by transverse frame members; a drive roll and an idle roll; means mounted upon said transverse members rotatably supporting said rolls in said frame in spaced apart parallel relation; a power absorption device connected to said drive roll; a lift plate disposed between said rolls; an inflatable member beneath said lift plate for elevating and extending lengthwise of said lift plate upon inflation of said inflatable member; means guiding said lift plate for vertical movement relative to said rolls; and stop means for limiting the upward movement of said lift plate and including stop elements carried by said lift plate and engageable with said transverse frame members.

3. Chassis dynamometer apparatus, comprising: a frame including longitudinal frame members interconnected by transverse frame members; a drive roll and an idle roll; means mounted upon said transverse members rotatably supporting said rolls in said frame in spaced apart parallel relation; a power absorption device connected to said drive roll; a lift plate disposed between said rolls; a pair of brake bands, each of said brake bands having one end thereof connected with a different one of said longitudinal members and having the opposite ends thereof connected with said lift plate; an inflatable member beneath said lift plate and extending lengthwise of said lift plate for elevating said lift plate upon inflation of said inflatable member; means guiding said lift plate for vertical movement relative to said rolls; and stop means for limiting the upward movement of said lift plate and including stop elements carried by said lift plate and engageable with said transverse frame members.

4. In a chassis dynamometer, the combination comprising: a frame including longitudinally extending channel members disposed in confronting relation with the flanges thereof extending toward each other; a pair of rolls adapted to be engaged by the driven wheels of a vehicle; means rotatably supporting said rolls on said frame; a lift plate disposed between said rolls, said lift plate having downwardly extending flanges along the longitudinal edges thereof to stiffen the same, each of said longitudinal channel members having a flange extending downwardly therefrom; a pair of brake bands, each of said brake bands having one end thereof connected with a different one of the depending flanges of said channel members; means adjustably connecting the opposite ends of said brake bands to different ones of the depending flanges of said lift plate; and a flexible inflatable member beneath said lift plate and extending lengthwise of said lift plate for elevating said lift plate upon inflation of said inflatable member, whereby when the lift plate is elevated to raise the wheels of a vehicle off said rolls, said bands will be automatically engaged with said rolls to lock the same against rotation.

5. A chassis dynamometer apparatus, comprising: a frame including longitudinal and transverse frame members; a drive roll and an idle roll; means rotatably supporting said rolls on said frame; a power absorption device connected to said drive roll; a lift plate disposed between said rolls; a flexible, tubular, inflatable member beneath said lift plate adapted to extend along substantially the entire length thereof for elevating said lift plate upon inflation of said inflatable member; a mounting plate positioned above said inflatable member and extending substantially the entire length thereof, said inflatable member being bonded to the underside of said mounting plate; means securing said mounting plate to the underside of said lift plate; guide means positioning said lift plate substantially centrally of said rolls, said guide means including a stationary, vertical, guiding element secured to one of said transverse frame members and a guided element connected with said lift plate and engaging said guiding element to be guided thereby; and a mounting plate bonded to the underside of said inflatable member along substantially the entire length thereof for anchoring said inflatable member in position between said rolls.

6. A chassis dynamometer apparatus, comprising: a frame including longitudinal and transverse frame members; a drive roll and an idle roll; means rotatably supporting said rolls on said frame; a power absorption device connected to said drive roll; a lift plate disposed between said rolls; a flexible, tubular, inflatable member beneath said lift plate adapted to bear against the underside of said lift plate along substantially the entire length thereof for elevating said lift plate upon inflation of said inflatable member; guide means positioning said lift plate substantially centrally of said rolls, said guide means including a stationary, vertical, guiding element secured to one of said transverse frame members and a guided element connected with said lift plate and engaging said guiding element to be guided thereby; and a mounting plate bonded to the underside of said inflatable member along substantially the entire length thereof for anchoring said inflatable member in position between said rolls.

References Cited in the file of this patent

UNITED STATES PATENTS

| | | |
|---|---|---|
| 1,184,159 | Becker | May 23, 1916 |
| 2,337,573 | Schultz | Dec. 28, 1943 |
| 2,495,092 | Cox et al. | Jan. 17, 1950 |
| 2,583,201 | Bennett | Jan. 22, 1952 |
| 2,610,824 | Grier | Sept. 16, 1952 |
| 2,674,876 | Caudill | Apr. 13, 1954 |